United States Patent
Auger et al.

(10) Patent No.: US 7,950,091 B2
(45) Date of Patent: May 31, 2011

(54) CLEATED ARTICLE OF FOOTWEAR AND METHOD OF MANUFACTURE

(75) Inventors: Perry W. Auger, Tigard, OR (US); Peter A. Hudson, Portland, OR (US); Neil Crumbleholme, Portland, OR (US); Matteo Tessaro, Treviso (IT)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 12/769,044

(22) Filed: Apr. 28, 2010

(65) Prior Publication Data

US 2010/0205756 A1    Aug. 19, 2010

Related U.S. Application Data

(62) Division of application No. 10/900,985, filed on Jul. 28, 2004, now Pat. No. 7,730,636.

(51) Int. Cl.
  A43B 5/00 (2006.01)
  A43C 15/00 (2006.01)
(52) U.S. Cl. .............. 12/142 P; 12/142 T; 12/146 B; 12/142 F; 36/12; 36/15
(58) Field of Classification Search ............ 12/142 P, 12/142 T, 146 B, 142 F; 36/17 R, 98, 15, 36/100, 101, 67 R, 67 A, 67 B
See application file for complete search history.

(56) References Cited

U.S. PATENT DOCUMENTS

| | | | |
|---|---|---|---|
| 997,657 A | 7/1911 | Drake | |
| 1,219,507 A | 3/1917 | Teare | |
| 1,728,010 A | 9/1929 | Sheill | |
| 2,032,598 A | 3/1936 | Shannon | |
| 2,070,269 A | 2/1937 | Goldenberg | |
| 2,471,113 A | 5/1949 | Melchionna | |
| 2,931,110 A * | 4/1960 | Pietrocola | 36/30 R |
| 3,373,510 A | 3/1968 | Memole et al. | |
| 3,466,763 A | 9/1969 | Levin | |
| 3,538,628 A | 11/1970 | Einstein, Jr. | |
| 3,846,919 A | 11/1974 | Milotic | |
| 4,335,530 A * | 6/1982 | Stubblefield | 36/83 |
| 4,420,894 A | 12/1983 | Glassman | |
| 4,481,727 A * | 11/1984 | Stubblefield | 36/83 |
| 4,538,368 A | 9/1985 | Mugford | |
| 4,745,693 A | 5/1988 | Brown | |

(Continued)

FOREIGN PATENT DOCUMENTS

BE    493654    6/1950

(Continued)

OTHER PUBLICATIONS

International Search Report issued Nov. 16, 2005 in related PCT Application No. PCT/US2005/025867.

*Primary Examiner* — Jila M Mohandesi
(74) *Attorney, Agent, or Firm* — Banner & Witcoff, Ltd.

(57) ABSTRACT

A cleated article of footwear includes a chassis assembly having a sole plate having a plurality of bosses extending from a lower surface thereof. A heel counter extends upwardly from a heel portion of the sole plate. An outer assembly is secured to the chassis assembly and includes a sole portion and an upper secured to the sole portion. A plurality of cleats extends downwardly from a lower surface of the sole portion. Each of a plurality of apertures extends downwardly into a corresponding cleat and receives a boss.

8 Claims, 4 Drawing Sheets

U.S. PATENT DOCUMENTS

| | | | |
|---|---|---|---|
| 4,747,220 A | 5/1988 | Autry et al. | |
| 4,825,563 A | 5/1989 | Strongwater | |
| 4,850,122 A | 7/1989 | Schwab, Jr. | |
| 4,887,369 A | 12/1989 | Bailey et al. | |
| 4,974,344 A | 12/1990 | Ching | |
| 5,083,385 A | 1/1992 | Halford | |
| 5,367,791 A | 11/1994 | Gross et al. | |
| 5,381,610 A | 1/1995 | Hanson | |
| 5,410,821 A | 5/1995 | Hilgendorf | |
| 5,533,280 A | 7/1996 | Halliday | |
| 5,661,915 A | 9/1997 | Smith | |
| 5,797,199 A * | 8/1998 | Miller et al. | 36/28 |
| 5,799,417 A | 9/1998 | Burke et al. | |
| 5,822,888 A | 10/1998 | Terry | |
| 5,915,820 A | 6/1999 | Kraeuter et al. | |
| 5,991,950 A | 11/1999 | Schenkel | |
| 6,023,857 A | 2/2000 | Vizy et al. | |
| 6,023,859 A | 2/2000 | Burke et al. | |
| 6,032,386 A | 3/2000 | Evans | |
| 6,145,221 A | 11/2000 | Hockerson | |
| 6,442,874 B1 | 9/2002 | Long | |
| 6,658,766 B2 | 12/2003 | Kraeuter et al. | |
| 6,915,596 B2 | 7/2005 | Grove et al. | |
| 7,010,872 B2 | 3/2006 | Pawlus et al. | |
| 7,111,415 B2 | 9/2006 | Hockerson | |
| 7,203,985 B2 * | 4/2007 | Cox et al. | 12/146 B |
| 7,634,831 B2 * | 12/2009 | Stockbridge et al. | 12/142 F |
| 2004/0031170 A1 * | 2/2004 | Chi | 36/29 |
| 2006/0000035 A1 * | 1/2006 | Kendall | 12/142 P |

FOREIGN PATENT DOCUMENTS

| | | |
|---|---|---|
| EP | 0723745 A | 7/1996 |
| FR | 1019139 A | 1/1953 |
| FR | 2250266 A | 5/1975 |
| FR | 2420312 A | 10/1979 |
| FR | 2813766 | 3/2002 |
| WO | 9746127 | 12/1997 |

* cited by examiner

CLEATED ARTICLE OF FOOTWEAR AND METHOD OF MANUFACTURE

RELATED APPLICATIONS

This application is a divisional of U.S. application Ser. No. 10/900,985, filed Jul. 28, 2004, now U.S. Pat. No. 7,730,636, which is incorporated herein by reference in its entirety.

FIELD OF THE INVENTION

This invention relates generally to a cleated article of footwear, and, in particular, to a slip lasted cleated article of footwear having an improved construction and method of manufacture.

BACKGROUND OF THE INVENTION

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces (i.e., imparting cushioning), the sole structure may provide fraction and control foot motions, such as pronation. Accordingly, the upper and the sole structure operate cooperatively to provide a comfortable structure that is suited for a variety of ambulatory activities, such as walking and running.

The sole structure of athletic footwear generally exhibits a layered configuration that includes a comfort-enhancing insole, a resilient midsole formed from a polymer foam material, and a ground-contacting outsole that provides both abrasion-resistance and fraction. The midsole is the primary sole structure element that imparts cushioning and controls foot motions. Suitable polymer foam materials for the midsole include ethylvinylacetate (EVA) or polyurethane (PU) that compress resiliently under an applied load to attenuate ground reaction forces. Conventional polymer foam materials are resiliently compressible, in part, due to the inclusion of a plurality of open or closed cells that define an inner volume substantially displaced by gas. The polymer foam materials of the midsole may also absorb energy when compressed during ambulatory activities.

Athletes in many sports, including, for example, football, soccer, and lacrosse, use cleated footwear. The sole structure of cleated footwear includes a plurality of cleats that extend from a lower surface of the sole and serve to engage the ground, thereby increasing traction for the user. Often times, the cleats are formed of one-piece construction with the sole. Alternatively, the cleats are removably secured to the sole, such as by a threaded member extending from the cleat that is received by a threaded member in the sole.

It is an object of the present invention to provide a cleated article of footwear that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a cleated article of footwear. In accordance with a first preferred embodiment, a cleated article of footwear includes a chassis assembly having a sole plate having a plurality of bosses extending from a lower surface thereof. A heel counter extends upwardly from a heel portion of the sole plate. An outer assembly is secured to the chassis assembly and includes a sole portion and an upper secured to the sole portion. A plurality of cleats extends downwardly from a lower surface of the sole portion. Each of a plurality of apertures extends downwardly into a corresponding cleat and receives a boss.

In accordance with another preferred embodiment, a cleated article of footwear includes a chassis assembly having a sole plate with a plurality of bosses extending from a lower surface thereof. A heel counter is adhesively secured to a heel portion of the sole plate. An outer assembly is secured to the chassis assembly and includes a sole portion and an upper secured to the sole portion with stitch and turn stitching. A layer of heat activated adhesive is found on an upper surface of the sole portion to adhesively secure the outer assembly to the chassis assembly. A plurality of cleats is secured to a lower surface of the sole portion by direct injection. A plurality of apertures is formed in the sole portion, with each aperture extending downwardly into a corresponding cleat and receiving a boss.

In accordance with a further embodiment, a method of assembling a cleated article of footwear includes the following steps: securing a heel counter to a sole plate of a chassis assembly, the chassis assembly having a plurality of bosses extending outwardly from a lower surface thereof; securing a plurality of cleats to a sole portion of an outer assembly, the sole portion having a plurality of apertures, each cleat having a recess in an upper surface thereof, each aperture aligned with a recess of a corresponding cleat; securing an upper portion of the outer assembly to the sole portion; placing a layer of heat activated adhesive on an upper surface of the sole portion; placing the chassis assembly on a last; placing a layer of heat activated adhesive on a lower surface of the sole plate of the chassis assembly; slipping the outer assembly over the chassis assembly such that the bosses extend through the apertures in the sole portion and into the recesses in the cleats to form an article of footwear; applying heat to the article of footwear to activate the heat activated adhesive; and applying pressure to the article of footwear to bond a lower surface of the chassis assembly to the upper surface of the outer assembly.

In accordance with yet another embodiment, a method of assembling a cleated article of footwear includes the following steps, in combination: securing a heel counter to a sole plate of a chassis assembly with adhesive, the chassis assembly having a plurality of bosses extending outwardly from a lower surface thereof; injection molding a plurality of cleats to a sole portion of an outer assembly, the sole portion having a plurality of apertures, each cleat having a recess in an upper surface thereof, each aperture aligned with a recess of a corresponding cleat; securing an upper portion of the outer assembly to the sole portion with stitch and turn stitching; placing a layer of heat activated adhesive on an upper surface of the sole portion; securing the chassis assembly on a last temporarily; placing a layer of heat activated adhesive on a lower surface of the sole plate of the chassis assembly; slipping the outer assembly over the chassis assembly such that the bosses extend through corresponding apertures in the sole portion and recesses in the cleats to form an article of footwear; applying heat to the article of footwear to activate the heat activated adhesive; applying pressure to the article of footwear to bond a lower surface of the chassis assembly to the upper surface of the outer assembly; inserting an insole into the outer assembly above the sole portion; and inserting a heel pad into a heel portion of the outer assembly.

Substantial advantage is achieved by providing a cleated article of footwear. In particular, certain preferred embodiments of the present invention can produce a slip lasted cleated article of footwear, and which has cleats that are reinforced with bosses received therein.

These and additional features and advantages of the invention disclosed here will be further understood from the following detailed disclosure of certain preferred embodiments.

Figure 1:
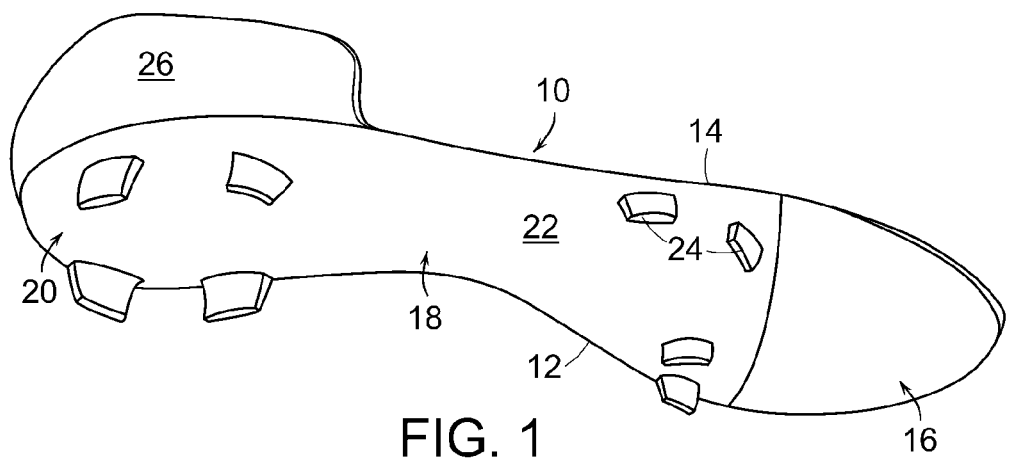
FIG. 1 is a perspective view of a chassis assembly of a cleated article of footwear in accordance with a preferred embodiment of the present invention.

The figures referred to above are not drawn necessarily to scale and should be understood to provide a representation of the invention, illustrative of the principles involved. Some features of the cleated article of footwear depicted in the drawings have been enlarged or distorted relative to others to facilitate explanation and understanding. The same reference numbers are used in the drawings for similar or identical components and features shown in various alternative embodiments. Cleated articles of footwear as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of a chassis assembly 10 of a cleated article of footwear 11 (seen in assembled form in FIGS. 6-7) is shown in FIG. 1. Chassis assembly 10 has a medial, or inner, side 12 and a lateral, or outer, side 14. For purposes of general reference, all of footwear 11, including chassis assembly 10, may be divided into three general portions: a forefoot portion 16, a midfoot portion 18, and a heel portion 20. Portions 16, 18, and 20 are not intended to demarcate precise areas of footwear 11. Rather, portions 16, 18, and 20 are intended to represent general areas of footwear 11 that provide a frame of reference during the following discussion.

Unless otherwise stated, or otherwise clear from the context below, directional terms used herein, such as rearwardly, forwardly, inwardly, downwardly, upwardly, etc., refer to directions relative to footwear 11 itself. Chassis assembly 10 of footwear 11 is shown in FIG. 1 to be disposed substantially horizontally, as it would be positioned on a horizontal surface when worn by a wearer. However, it is to be appreciated that footwear 11 need not be limited to such an orientation. Thus, in the illustrated embodiment of FIG. 1, rearwardly is toward heel portion 20, that is, to the left as seen in FIG. 1. Naturally, forwardly is toward forefoot portion 16, that is, to the right as seen in FIG. 1, and downwardly is toward the bottom of the page as seen in FIG. 1. Inwardly is toward the center of footwear 11, and outwardly is toward the outer peripheral edge of footwear 11.

Chassis assembly 10 includes a sole plate 22 having a plurality of bosses 24 extending downwardly from a lower surface thereof. In the illustrated embodiment, two pairs of bosses are positioned on sole plate 22 proximate the junction of midfoot portion 18 and forefoot portion 16 beneath the ball of a user's foot, one pair on lateral side 14 and one pair on medial side 12. Two additional pairs of bosses are positioned in heel portion 20 of sole plate 22, one pair on lateral side 14 and the other pair on medial side 12. In a preferred embodiment, bosses 24 are of unitary, that is, one-piece construction with sole plate 22.

Bosses 24 are received in cleats of footwear 11, as described in greater detail below. It is to be appreciated that any number of bosses and corresponding cleats can be provided on footwear 11 and that the pairs of cleats and their locations described are merely exemplary.

A heel counter 26 extends upwardly from heel portion 20 of sole plate 22 and serves to surround the user's heel, providing support and stability for the user's heel. In a preferred embodiment, heel counter 26 is secured to sole plate 22 with an adhesive. In other embodiments, heel counter 26 and sole plate 22 may be co-molded by injection molding. It is to be appreciated that in other preferred embodiments, heel counter 26 may be of unitary construction with sole plate 22.

In a preferred embodiment, forefoot portion 16 of sole plate 22 is formed of a first material and the remainder of sole plate 22 is formed of a second material. Forefoot portion 16 is preferably formed of a relatively flexible material, for example, non-reinforced nylon, in order to provide flexibility for that portion of footwear 10 that flexes when a user is running or walking, while midfoot portion 18 and sole portion 20 are formed of a material that is stiffer, e.g., reinforced nylon, or a composite, in order to provide rigidity and stability. It is to be appreciated that all the portions of chassis plate 10 could be formed of the same material.

Figure 2:
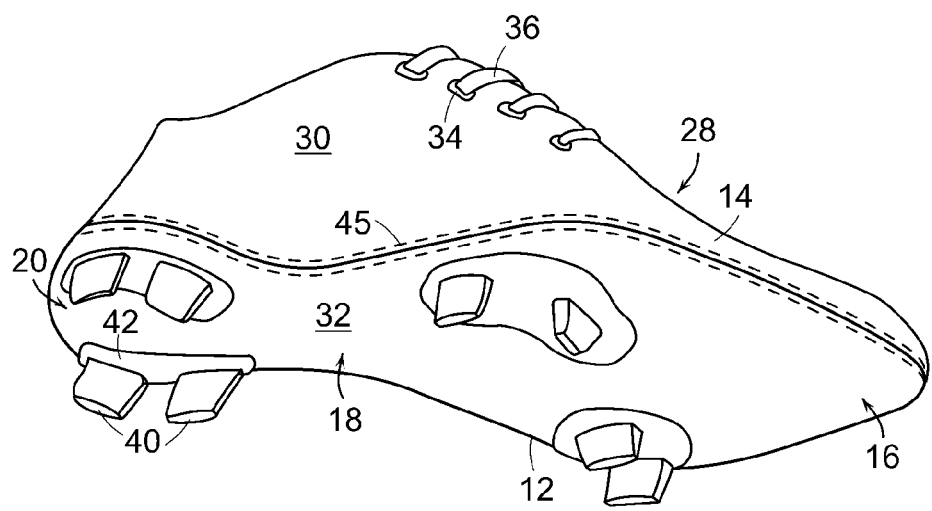
FIG. 2 is a perspective view of an outer assembly of the cleated article of footwear in accordance with a preferred embodiment of the present invention.

An outer assembly 28 of article of footwear 11 is shown in FIG. 2. Outer assembly 28 includes an upper portion 30 secured to a sole portion 32. Upper portion 30 preferably has eyelets 34 through which laces 36 pass to secure footwear 11 to the user's foot. In a preferred embodiment, sole portion 32 and upper portion 30 are formed of synthetic leather. Sole portion and upper portion may be formed of natural leather, or other textiles such as polyester or nylon.

Sole portion 32 may be formed, for example, of synthetic leather, polyurethane film, or a combination of synthetic leather and a polyurethane film. Sole portion 32 includes a plurality of cleats 40. Cleats 40 are positioned on sole portion 32 so as to align with and receive bosses 24 of sole plate 22 as described in greater detail below. Thus, in the illustrated embodiment, two pairs of cleats 40 are positioned on sole portion 32 proximate the junction of midfoot portion 18 and forefoot portion 16 beneath the ball of a user's foot, one pair on lateral side 14 and one pair on medial side 12, and two pairs of cleats 40 are positioned in heel portion 20 of sole portion 32, one pair on lateral side 14 and the other pair on medial side 12. In a preferred embodiment, cleats 40 are formed of a rigid polymer material such as polyurethane or nylon.

Figure 3:
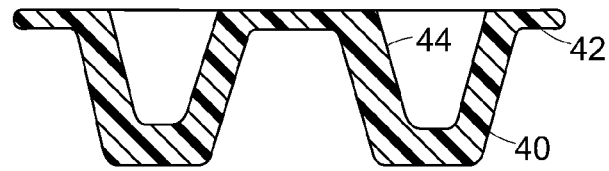
FIG. 3 is a section view of a pair of cleats of the outer assembly of FIG. 2.

Cleats 40 have a base 42 that is secured to sole portion 32. In a preferred embodiment cleats 40 and base 42 are injected onto sole portion 32. It is to be appreciated that cleats 40 and base 42 can be secured to sole portion 32 by an adhesive or other suitable fastening means. When using an adhesive, a primer may be used as well. As illustrated here, each pair of cleats 40 shares a single base 42. It is to be appreciated that in other embodiments, each cleat 40 could have its own base 42, or more than two cleats 40 could share a base 42. As can be seen in FIG. 3, cleats 40 include a recess 44 that receives a corresponding boss 24 when outer assembly 28 and chassis assembly 10 are joined together. Bosses 24 serve to register or align outer assembly 28 and chassis assembly 10 with one another, and also provide additional support and rigidity for cleats 40.

Figure 4:
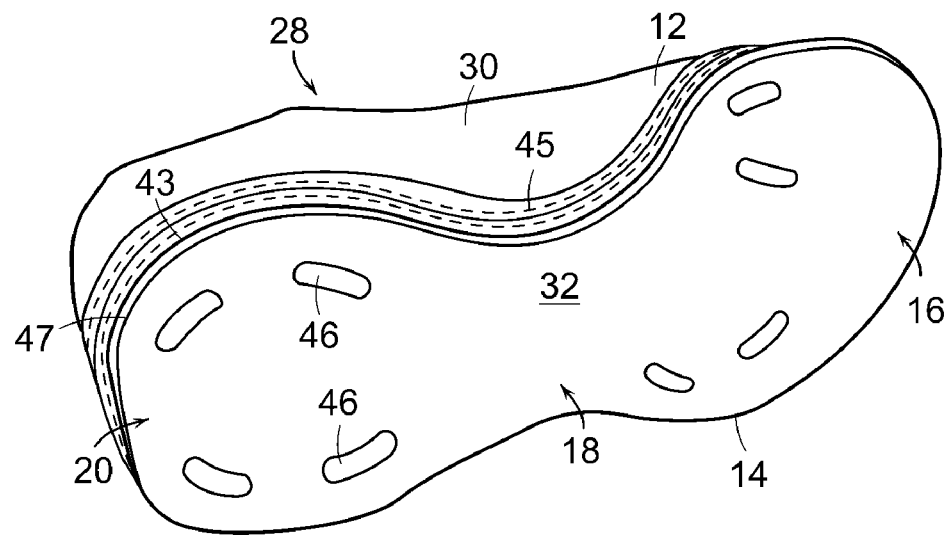
FIG. 4 is a perspective view of the outer assembly of FIG. 2, shown in an inverted position with an upper portion secured to a sole portion with stitch and turn stitching.

Outer assembly 28 is shown in an inverted condition in FIG. 4, with an upper surface 43 of sole portion 32 exposed, in which position sole portion 32 and outer assembly 28 are secured to one another. In a preferred embodiment, sole portion 32 and outer assembly 28 are secured to one another with stitch and turn stitching 45, with the outer edges of the material of sole portion 32 and outer assembly 28 folded over and stitched to themselves. It is to be appreciated that upper portion 30 may be secured to sole portion 32 by an adhesive or any other suitable means. When using an adhesive, a primer may be used as well. Other suitable means for securing upper portion 30 to sole portion 32 will become readily apparent to those skilled in the art, given the benefit of this disclosure.

A layer of heat activated adhesive 47 is applied to upper surface 43 when outer assembly 28 is in this inverted position, which serves to secure sole portion 32 to sole plate 22 as described in greater detail below. In a preferred embodiment, heat activated adhesive 47 is polyurethane. A primer may be placed on upper surface 43 prior to applying adhesive 47. Other suitable heat activated adhesives will become readily apparent to those skilled in the art, given the benefit of this disclosure.

Sole portion 32 includes a plurality of apertures 46 through which bosses 24 extend when outer assembly 28 and chassis assembly 10 are joined together. Apertures 46 are necessarily positioned above cleats 40 and, therefore, in this embodiment two pairs of apertures 46 are positioned on sole portion 32 proximate the junction of midfoot portion 18 and forefoot portion 16 beneath the ball of a user's foot, one pair on lateral side 14 and one pair on medial side 12, and two pairs of apertures 46 are positioned in heel portion 20 of sole portion 32, one pair on lateral side 14 and the other pair on medial side 12.

It is to be appreciated that the number of cleats 40 and corresponding bosses 24 as well as their location on footwear 11 can vary based on any number of factors including, for example, the size of footwear 11, and the type of activity and conditions for which footwear 11 is designed. The appropriate number and location of cleats 40 and bosses 24 will be easily determined by those skilled in the art, given the benefit of this disclosure.

Figure 5:
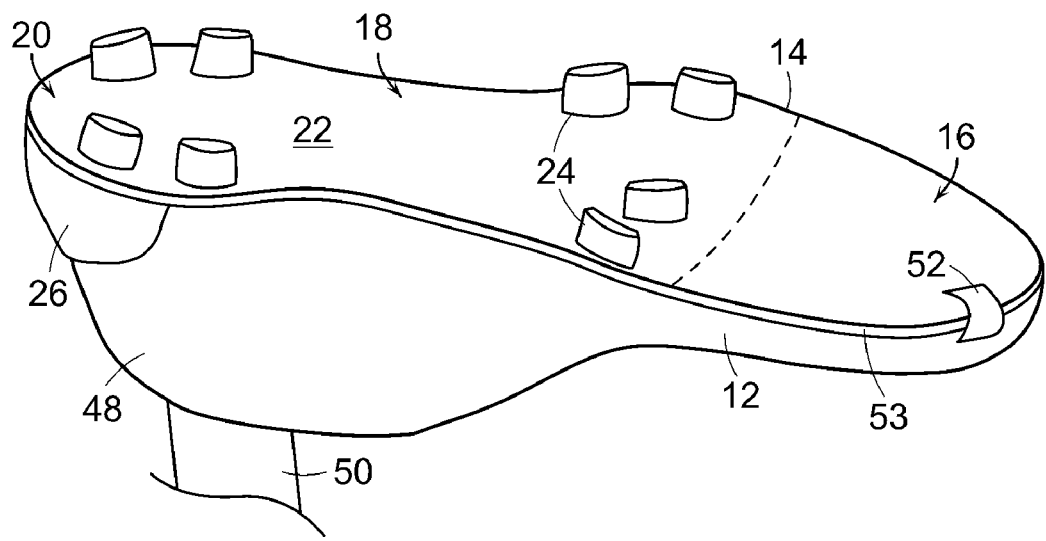
FIG. 5 is a perspective view of a chassis assembly of the cleated article of footwear of FIG. 1, shown in an inverted position and temporarily secured to a last.

The assembly of article of footwear 11 will now be described in connection with FIGS. 4-8. As seen in FIG. 5, chassis assembly 10 is placed in an inverted position on a last 48, which is supported on a support post 50. Chassis assembly 10 may be temporarily secured to last 48 by a piece of tape 52 or other suitable fastening means. A layer of heat activated adhesive 53 is applied to the lower surface of sole plate 22 (seen here as an upper surface since chassis assembly 10 is inverted). In a preferred embodiment, heat activated adhesive 53 is polyurethane. A primer may be placed on upper surface 43 prior to applying adhesive 47. Other suitable heat activated adhesives will become readily apparent to those skilled in the art, given the benefit of this disclosure.

Figure 6:
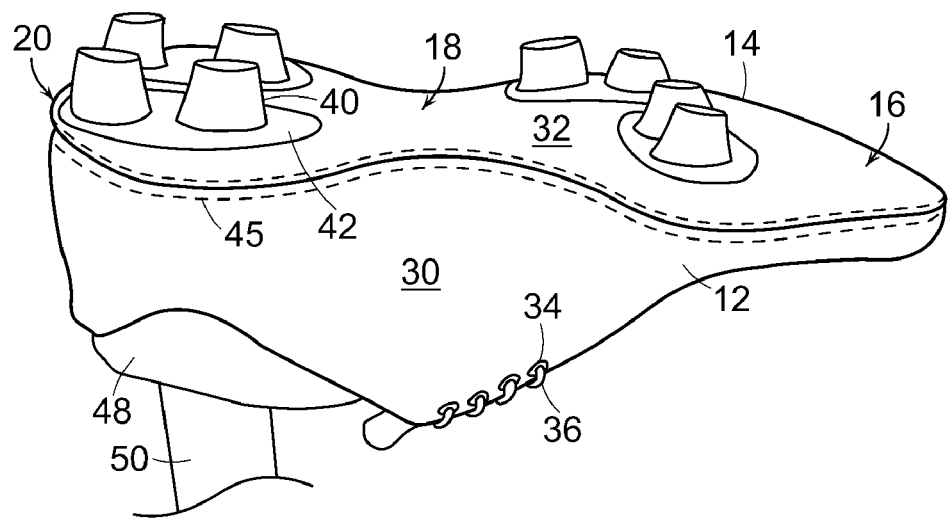
FIG. 6 is a perspective view of an assembled cleated article of footwear in accordance with a preferred embodiment of the present invention, shown supported in an inverted position on a last.
Figure 7:
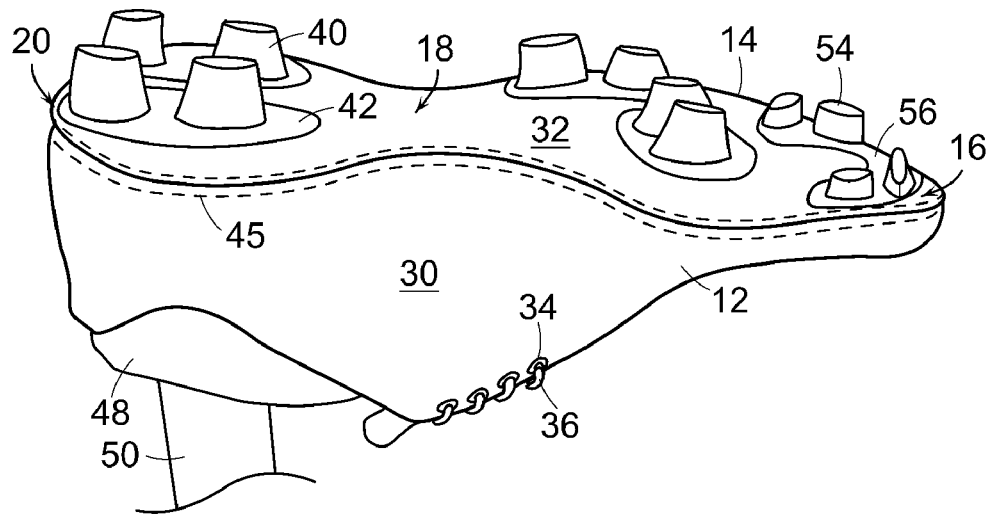
FIG. 7 is a perspective view of the cleated article of footwear of FIG. 6, shown with a plurality of additional cleats secured to a forefoot portion of the sole portion of the outer assembly.

Outer assembly 28 is assembled from sole portion 32 and upper portion 30. Initially, apertures 46 are punched or otherwise formed in sole portion 32 and cleats 40 and bases 42 are secured to sole portion 32, such as by direct injection molding. Sole portion 32 is then secured to upper portion 30 by stitch and turn stitching 45, with outer assembly 28 naturally in an inverted position as seen in FIG. 4. The layer of heat activated adhesive 47 is then applied to the exposed upper surface 43 of sole portion 32. Outer assembly 28 is then placed on chassis assembly 10 in its upright position to form article of footwear 11, as seen in FIG. 6, with forefoot portion 16 of outer assembly 28 initially slipped over forefoot portion 16 of chassis assembly 10 and then midfoot portion 18 and heel portion 20 pulled back over chassis assembly 10 in slip lasted fashion. As noted above, bosses 24 on sole plate 22 help to register and align sole portion 32 of outer assembly 28 with chassis assembly 10. The layer of adhesive 47 previously applied to upper surface 43 of sole portion 32 of outer assembly is now in contact with the exterior surface of sole plate 22 of chassis assembly 10.

Article of footwear 11 and last 48 are then removed from support post 50 and then placed in a heat tunnel (not shown) or another device that applies heat to footwear 11 to activate the heat activated adhesive 47 on upper surface 43. In certain preferred embodiments, the heat tunnel heats the adhesive to a temperature between approximately 55° C. and 100° C., and, more preferably, to approximately 70° C. Article of footwear 11, which is still mounted on last 48, is then subjected to pressure in a press (not shown) to fully bond outer assembly 28 to chassis assembly 10. In a preferred embodiment, footwear 11 is subjected to a pressure of approximately 290 psi (20 bar).

Once outer assembly 28 has been securely bonded to chassis assembly 10, an additional set of cleats 54 may be secured to toe portion 16. In certain embodiment, a plurality of cleats 54 share a base 56, which is secured to toe portion 16 of sole plate 32 with an adhesive. A primer may be placed on sole portion 32 prior to applying the adhesive. As illustrated here, a pair of cleats 54 is positioned on lateral side 14 and a pair of cleats 54 is positioned on medial side 12 of sole plate 23. Cleats 54 do not include a recess, since there are no bosses to be received in cleats 54. Due to the slip lasting construction of footwear 11, cleats 54 are installed after outer assembly 28 is bonded to chassis assembly 10 so that outer assembly 28 can be passed over chassis assembly 10. Once cleats 54 have been secured to sole plate 32, footwear 11 can be de-lasted from last 48.

Figure 8:
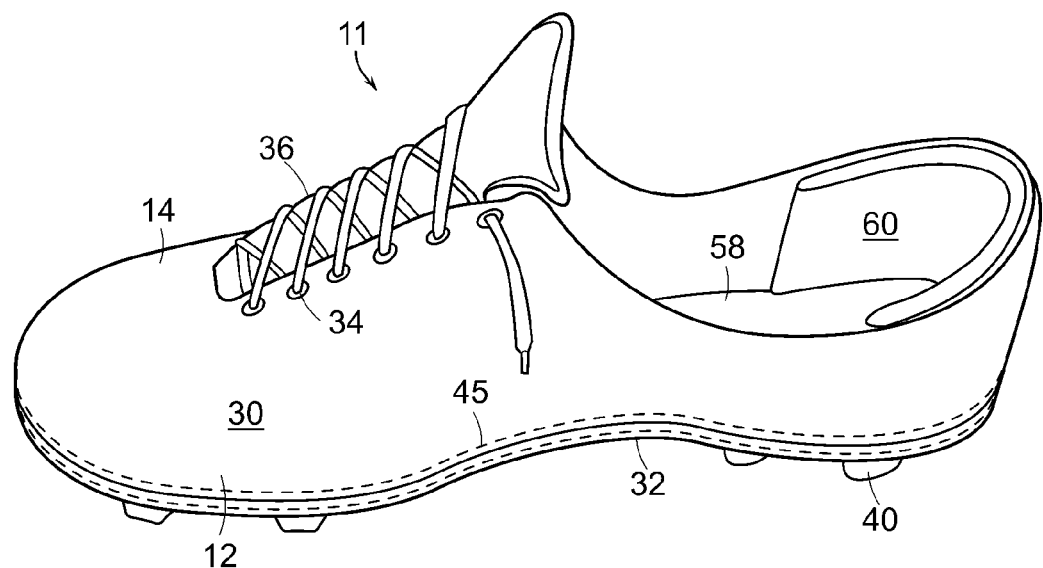
FIG. 8 is a perspective view of the completed cleated article of footwear of FIG. 6.

The de-lasted article of footwear 11 is seen in FIG. 8. As can be seen here, an insole 58 may be positioned within upper portion 30 on top of sole portion 32. A heel pad 60 may be positioned within heel portion 20 of upper portion 30 to provide comfort and support for the user's heel.

Figure 9:
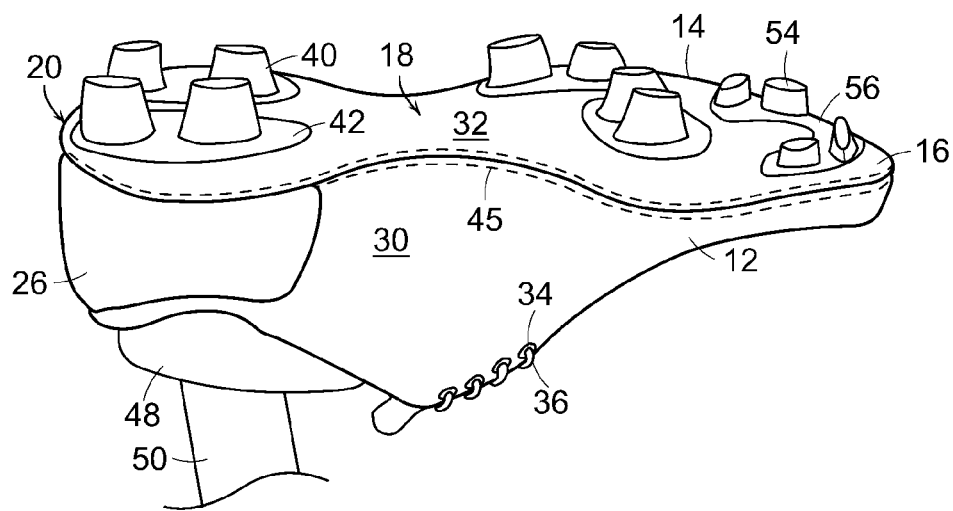
FIG. 9 is a perspective view of an assembled cleated article of footwear in accordance with an alternative embodiment of the present invention, shown supported in an inverted position on a last.

In another preferred embodiment, as illustrated in FIG. 9, heel counter 26 may be secured to an exterior surface of heel portion 20 of upper portion 30 of outer assembly 28. In such an embodiment, heel counter is secured to upper portion 30 after outer assembly 28 has been slip lasted on chassis assembly 10. A layer of adhesive, and optionally a layer of primer, is applied to heel counter 26 and the exterior surface of heel portion 20 of upper portion 30. Heel counter 26 is then positioned about heel portion 20. Footwear 11 is then subjected to heat and pressure as described above.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A method of assembling a cleated article of footwear comprising the following steps, in combination:

securing a heel counter to a sole plate of a chassis assembly, the chassis assembly having a plurality of bosses extending outwardly from a lower surface thereof;

securing a plurality of cleats to a sole portion of an outer assembly, the sole portion having a plurality of apertures, each cleat having a recess in an upper surface thereof, each aperture aligned with a recess of a corresponding cleat;

securing an upper portion of the outer assembly to the sole portion;

placing a layer of heat activated adhesive on an upper surface of the sole portion;

placing the chassis assembly on a last;

placing a layer of heat activated adhesive on a lower surface of the sole plate of the chassis assembly;

slipping the outer assembly over the chassis assembly such that the bosses extend through the apertures in the sole portion and into the recesses in the cleats to form an article of footwear;

applying heat to the article of footwear to activate the heat activated adhesive; and applying pressure to the article of footwear to bond a lower surface of the chassis assembly to the upper surface of the outer assembly.

2. The method of claim 1, further comprising the step of securing a plurality of cleats to a forefoot portion of a lower surface of the sole portion of the outer assembly.

3. The method of claim 1, wherein the sole portion is secured to the upper portion by stitch and turn stitching.

4. The method of claim 1, wherein the chassis assembly is temporarily secured to the last prior to sliding the outer assembly over the chassis assembly.

5. The method of claim 4, wherein the chassis assembly is temporarily secured to the last with tape.

6. The method of claim 1, wherein the step of securing the plurality of cleats to the sole portion of the outer assembly is performed by injecting molding the cleats onto the sole portion.

7. A method of assembling a cleated article of footwear comprising the following steps, in combination:

securing a heel counter to a sole plate of a chassis assembly with adhesive, the chassis assembly having a plurality of bosses extending outwardly from a lower surface thereof;

injection molding a plurality of cleats to a sole portion of an outer assembly, the sole portion having a plurality of apertures, each cleat having a recess in an upper surface thereof, each aperture aligned with a recess of a corresponding cleat;

securing an upper portion of the outer assembly to the sole portion with stitch and turn stitching;

placing a layer of heat activated adhesive on an upper surface of the sole portion;

securing the chassis assembly on a last temporarily;

placing a layer of heat activated adhesive on a lower surface of the sole plate of the chassis assembly;

slipping the outer assembly over the chassis assembly such that the bosses extend through corresponding apertures in the sole portion and recesses in the cleats to form an article of footwear;

applying heat to the article of footwear to activate the heat activated adhesive;

applying pressure to the article of footwear to bond a lower surface of the chassis assembly to the upper surface of the outer assembly;

inserting an insole into the outer assembly above the sole portion; and inserting a heel pad into a heel portion of the outer assembly.

8. A method of assembling a cleated article of footwear comprising the following steps, in combination:

securing a plurality of cleats to a sole portion of an outer assembly, the sole portion having a plurality of apertures, each cleat having a recess in an upper surface thereof, each aperture aligned with a recess of a corresponding cleat;

securing an upper portion of the outer assembly to the sole portion;

placing a layer of heat activated adhesive on an upper surface of the sole portion;

placing a chassis assembly on a last, the chassis assembly having a plurality of bosses extending outwardly from a lower surface thereof;

placing a layer of heat activated adhesive on a lower surface of the sole plate of the chassis assembly;

slipping the outer assembly over the chassis assembly such that the bosses extend through the apertures in the sole portion and into the recesses in the cleats to form an article of footwear;

placing a layer of heat activated adhesive on an interior surface of a heel counter;

placing a layer of heat activated adhesive on an exterior surface of a heel portion of the upper portion of the outer assembly;

securing the heel counter to the exterior surface of the upper portion;

applying heat to the article of footwear to activate the heat activated adhesive; and applying pressure to the article of footwear to bond a lower surface of the chassis assembly to the upper surface of the outer assembly and the heel counter to the upper portion.

\* \* \* \* \*